United States Patent [19]
Israelsen et al.

[11] Patent Number: 5,237,413
[45] Date of Patent: Aug. 17, 1993

[54] MOTION FILTER FOR DIGITAL TELEVISION SYSTEM

[75] Inventors: Paul D. Israelsen, North Logan, Utah; Keith Lucas, Richmond Hill, Canada

[73] Assignee: Scientific-Atlanta, Inc., Atlanta, Ga.

[21] Appl. No.: 794,426

[22] Filed: Nov. 19, 1991

[51] Int. Cl.$^5$ .............................................. H06N 5/21
[52] U.S. Cl. ................................... 358/160; 358/105; 358/133; 358/166; 358/167
[58] Field of Search ............... 358/105, 133, 135, 136, 358/138, 160, 166, 167

[56] References Cited

U.S. PATENT DOCUMENTS

| | | | |
|---|---|---|---|
| 4,716,462 | 12/1987 | Wargo | 358/166 |
| 4,733,297 | 3/1988 | Katsumata | 358/105 |
| 4,740,842 | 4/1988 | Annegarn | 358/105 |
| 4,752,826 | 6/1988 | Barnett | 358/136 |
| 4,864,398 | 9/1989 | Avis | 358/136 |

Primary Examiner—Howard W. Britton
Attorney, Agent, or Firm—Woodcock Washburn Kurtz Mackiewicz & Norris

[57] ABSTRACT

A method and apparatus for processing fields of a video signal that are to be combined into a frame, compressed and communicated over a digital communications system. The processing technique increases the spatial correlation between pixels at a cost of slightly reduced resolution in areas of the frame where there is movement. The method employs a motion detector to separate moving and non-moving areas of the frame. A simple combination of lines from a first field and a second field can be used in static areas. In moving areas, a digital filter is applied to the fields to increase correlation in the resulting field. A digital compression technique such as vector quantization is applied to the resulting frame-based signal.

24 Claims, 6 Drawing Sheets

$$M = \sum_{AREA} |x_A - x_C|$$

FIG. 5

MOTION FILTER FOR DIGITAL TELEVISION SYSTEM

FIELD OF THE INVENTION

The present invention generally relates to the field of data compression for digital communications systems, and more particularly relates to a motion filter for processing a digital television signal prior to data compression to increase spatial coherence in the signal.

BACKGROUND OF THE INVENTION

Communications systems typically transmit and receive data at predetermined data rates. Techniques that decrease the data rate are highly valuable. Data compression methods for improving the efficiency of video data transmission (or storage) build on both redundancies in the data and the nonlinearities of human vision. They exploit correlation in space of still images and in both space and time for video signals. Compression in space is known as intra-frame compression, while compression in time is called inter-frame compression. Methods that achieve high compression ratios (10:1 to 50:1 for images and 50:1 to 200:1 for video) typically are lossy in that the reconstructed image is not identical to the original. Lossless methods do exist, but their compression ratios are far lower, typically no better than 3:1.

The lossy algorithms also generally exploit aspects of the human visual system. For example, the eye is much more receptive to fine detail in the luminance (or brightness) signal than in the chrominance (or color) signals. Consequently, the luminance signal is usually sampled at a higher spatial resolution. (For example, in broadcast quality television, the digital sampling matrix of the luminance signal might be 720 by 480 pixels, while for the color signals it may be only 180 by 240 pixels.) In addition, the eye is less sensitive to energy with high spatial frequency than with low spatial frequency. Indeed, if an image on a 13-inch personal computer monitor were formed by an alternating spatial signal of black and white, the viewer would see a uniform gray instead of the alternating checkerboard pattern.

Three digital video standards that have been proposed are the Joint Photographic Experts Group (JPEG) standard for still picture compression; the Consultative Committee on International Telephony and Telegraphy (CCITT) Recommendation H.261 for video teleconferencing; and the Moving Pictures Experts Group (MPEG) for full-motion compression on digital storage media (DSM).

JPEG's proposed standard is a still picture-coding algorithm developed by a research team under the auspices of the International Standards Organization (ISO). The scope of the algorithm is broad: it comprises a baseline lossy approach and an extended lossless approach, as well as independent functions using coding techniques different from the baseline approach.

Figure 1A:
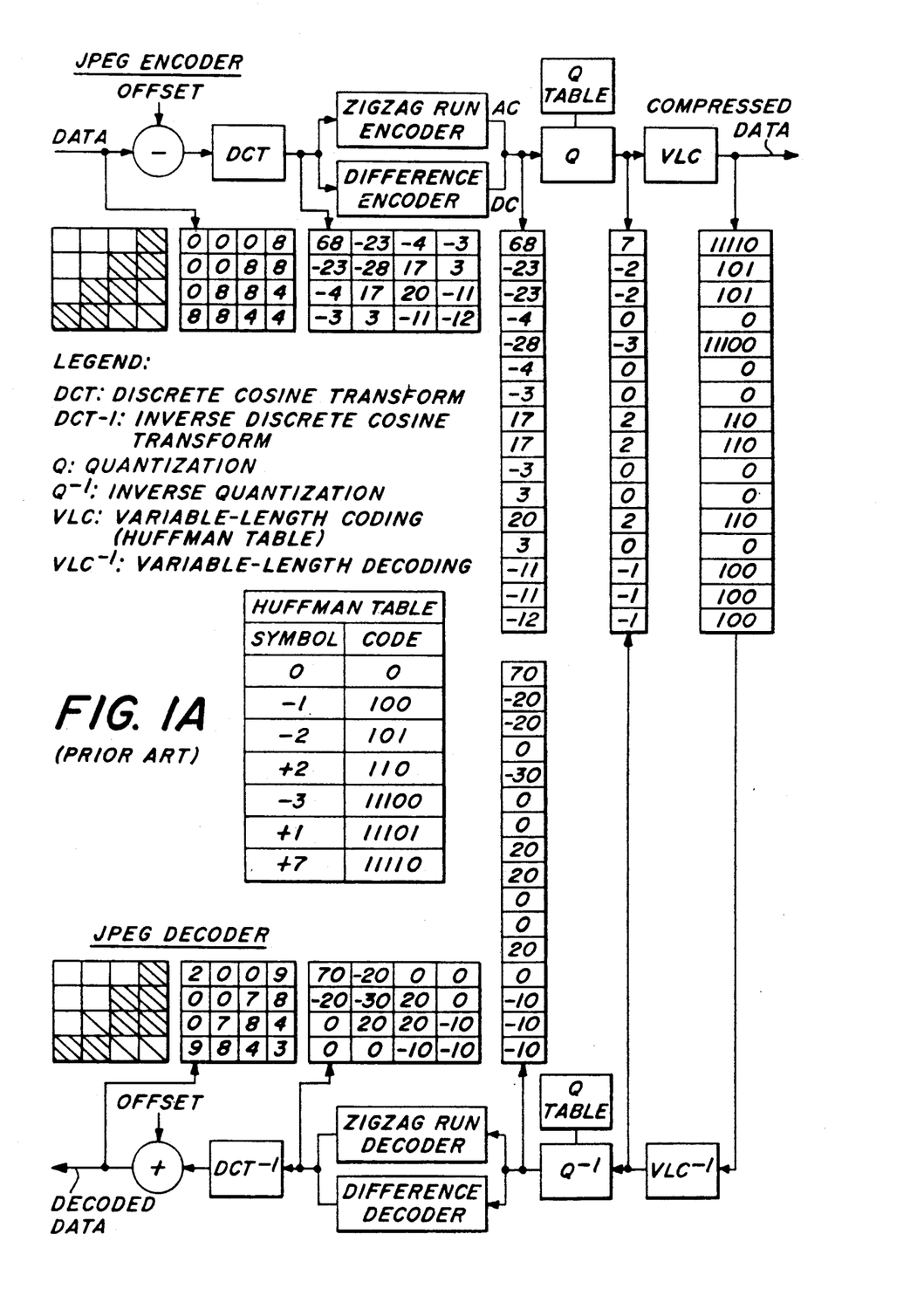
Figure 1B:
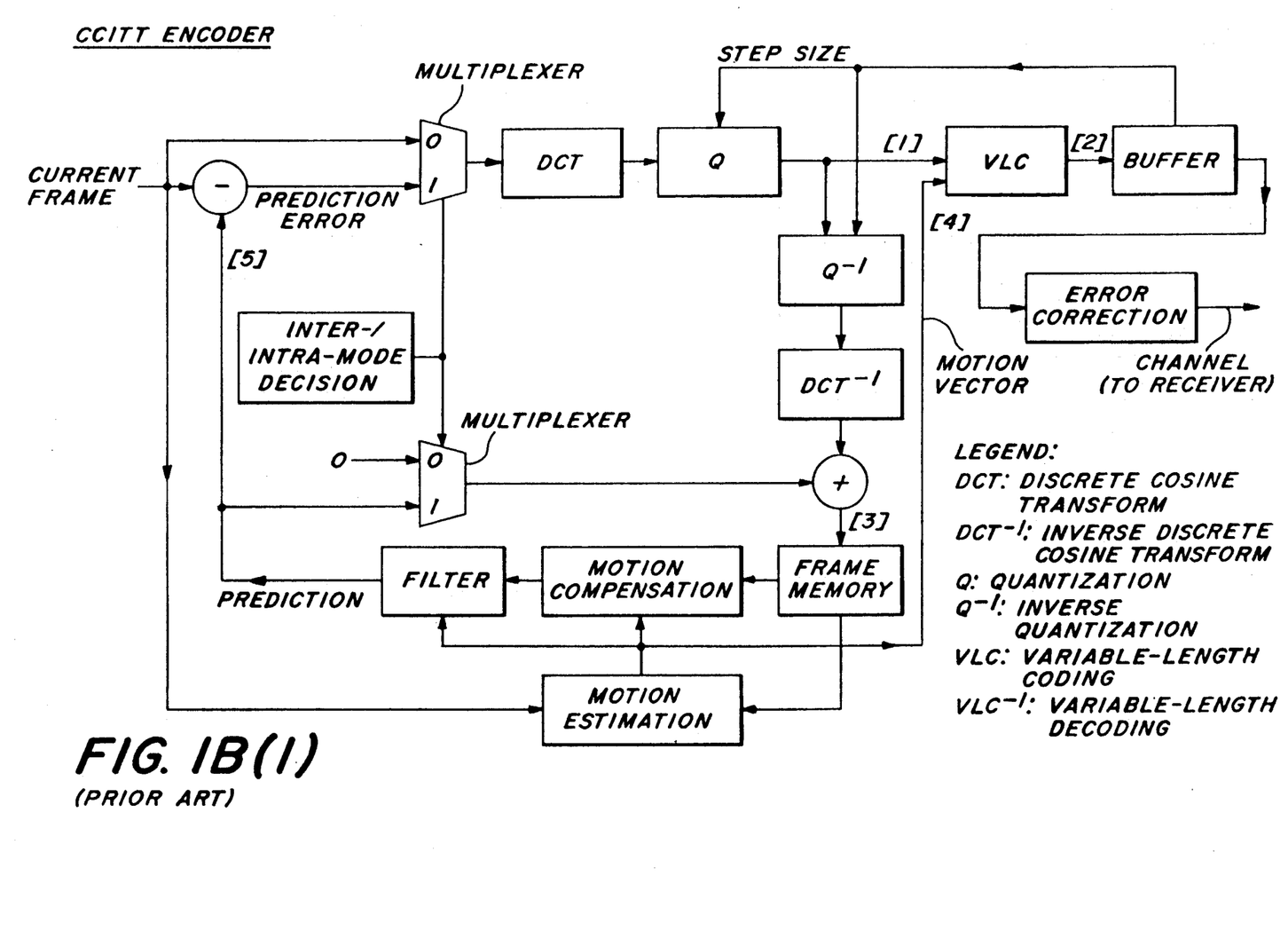

FIG. 1A depicts the baseline JPEG algorithm. The baseline algorithm for the compression of still images included in the JPEG proposed standard divides the image into 8-by-8 pixel blocks, represented in the figure by a 4-by-4 block for simplicity. In the encoder, the image is first digitized, then undergoes a discrete cosine transform (DCT) that yields 16 frequency coefficients. The two-dimensional array is read in a zigzag fashion to reorder it into a linear array. The coefficients obtained by quantization (dividing by 10) are then coded using the Huffman table (variable length coder).

The decoding path takes the variable-length coding (VLC) output and recovers the quantized coefficients, and turns the linear array into a 2-D array through an inverse zigzag operation.

FIG. 1B depicts the CCITT algorithm. The algorithm operates on a difference signal generated by an inter-frame predictive coder. Like the JPEG algorithm, each 8-by-8-pixel block of the frame is encoded with the DCT and then quantized, as indicated by the block labelled Q. There are two signal paths at the output of the quantization block Q: one leads toward a receiver through a lossless coder and optional error-correction circuitry; the other, a feedback, is inverse quantized and undergoes inverse DCT to yield a reconstructed block for storage in frame memory. Reconstruction is needed because interframe compression uses predictive coding, which requires the encoder to track the behavior of the decoder to prevent the decoder's reconstructed image from diverging from the original input. When the entire frame has been processed, a reconstructed image as seen by the decoder is stored in the frame memory block. Next, inter-frame coding is applied. To compensate for motion, each 8-by-8 block in the current frame is matched with a search window in the frame memory. Then a motion vector that represents the offset between the current block and a block in the prior reconstructed image that forms the best match is coded and sent to the receiver. The predictor provides the motion-compensated 8-by-8 block from the reconstructed frame. The difference between this and the original block is transform coded, quantized and coded before being sent to the receiver.

The CCITT decoder, shown at the bottom of FIG. 1B, first corrects incoming bit stream errors, and then decodes the data in the variable-length decoder. Inverse quantization and inverse DCT yield the DCT coefficients. In the decoder's frame memory a block like one in the encoder's feedback loop has been reconstructed and stored. In inter-frame mode, motion vectors extracted from the variable-length decoder are used to provide the location of the predicted blocks.

Figure 2:
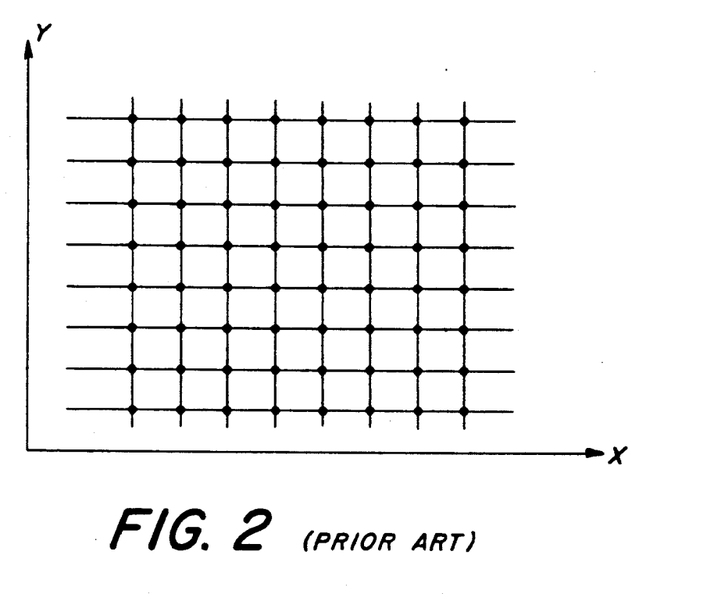
FIG. 2 depicts a rectangular sampling grid.
Figure 3A:
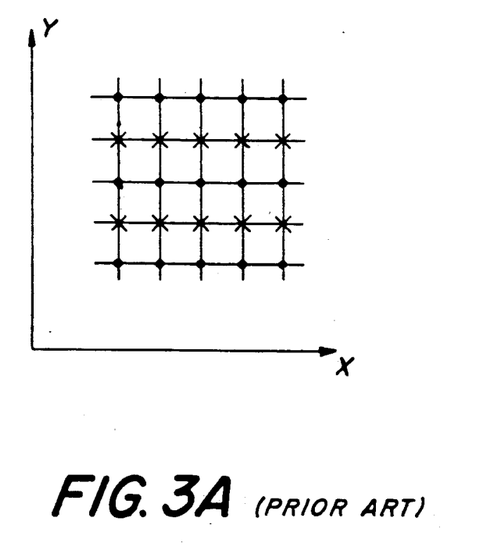
FIGS. 3A and 3B respectively depict a video frame in the (x,y) plane and video fields in the (y,t) plane.
Figure 3B:
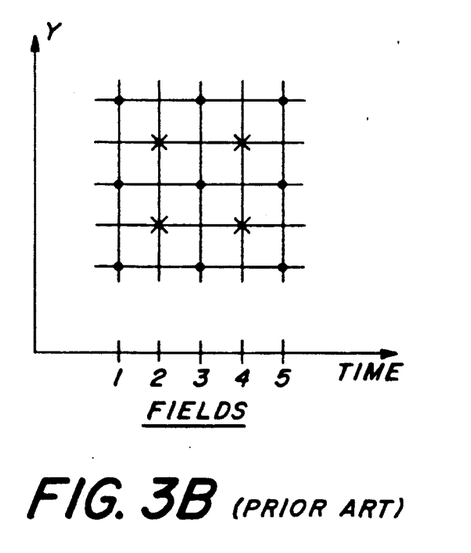

The foregoing compression techniques may be directly applied to stationary images that have been sampled using a rectangular grid of samples of the type depicted in FIG. 2. However, in the case of conventional television signals, interlaced scanning is applied such that individual fields do not contain a complete representation of the image. In a 525-line television picture (wherein each frame consists of two fields), half of the scan lines are displayed in even-numbered fields and the remainder are displayed in odd-numbered fields, as shown in FIGS. 3A and 3B. The human eye and brain partially integrate successive fields and thereby perceive all of the active lines.

Figure 4A:
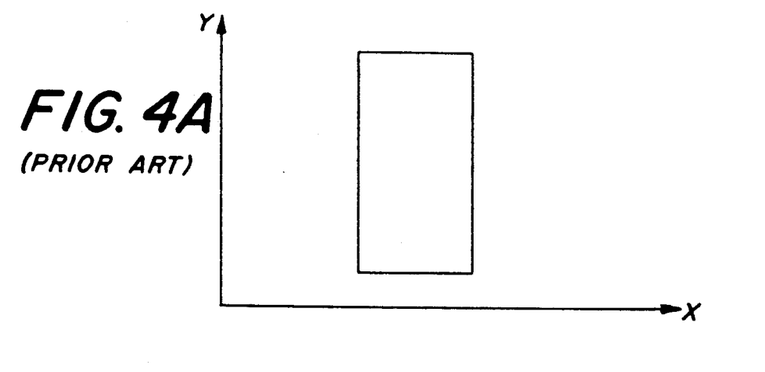
FIGS. 4A and 4B respectively depict static and dynamic scenes, where the dynamic scene includes horizontal motion.
Figure 4B:
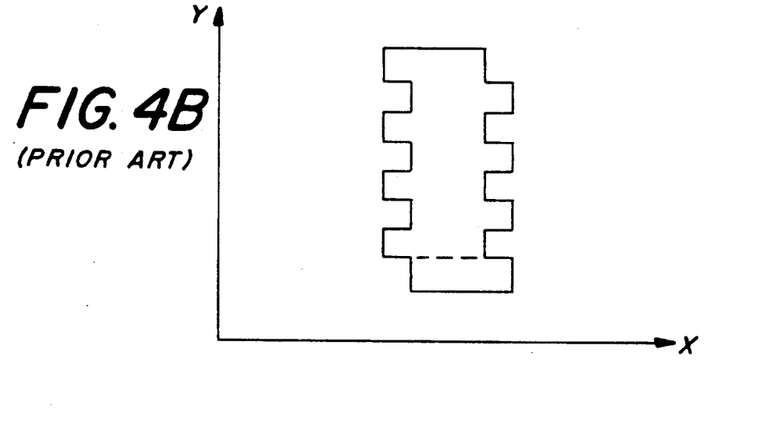

One effect of interlaced scanning is to reduce the amount of spatial correlation within a local region of the image. For example, if an n-by-n pixel segmentation is applied to one field, it will span 2n lines of the frame and will consist only of alternate lines. Similarly, if the n-by-n pixel segmentation is applied to a span of n frame lines (n/2 from each field), then spatial correlation will be decreased in moving areas of the image due to the 1/60 second interval between fields. In this case, a horizontally moving object in the image will appear blurred, or as an "artifact." This phenomenon is illustrated in a simplified way in FIGS. 4A and 4B, where FIG. 4A depicts a static image and FIG. 4B depicts a scene with horizontal motion. The areas of movement will have low spatial correlation and thus cannot be described by low frequency terms of a DCT. The same difficulty arises in the case of vector quantization and other compression techniques. Accordingly, the object of the present invention is to provide methods and apparatus for increasing the correlation in data representing moving areas of a television or video picture so that the data can be compressed without a loss in picture quality.

SUMMARY OF THE INVENTION

The present invention encompasses methods and apparatus for increasing the correlation between pixels of a television signal. Methods in accordance with the invention comprise the steps of filtering first ($X_A$) and second ($X_B$) fields of pixels to produce a filtered field ($X_B'$) with increased correlation to the first field; generating a motion parameter ($\alpha$) indicative of whether there is motion in the image; generating, as a function of $\alpha$, a weighted sum of the second and filtered fields ($X_B''$); and combining the first field with the weighted sum of the second and filtered fields to form a frame.

In one preferred embodiment of the invention the filtering step comprises vertically interpolating adjacent lines of the first field. Alternatively, in a second embodiment of the invention the filtering step comprises computing a weighted sum of adjacent lines of the first field and the second field. This step may, e.g., comprise applying approximately an 8 to 1 ratio of weights to the line of the second field and the adjacent lines of the first field. In a third embodiment the filtering step comprises vertically and horizontally combining pixels of the first and second fields.

The step of generating a motion parameter $\alpha$, in preferred embodiments, comprises summing over a prescribed area the absolute value of the difference between corresponding pixels in the first field and a third field ($X_C$) representing the image at a later instant in time (e.g., representing the first field of the next frame).

In another embodiment the motion parameter $\alpha$ is restricted to values between 0 and 1 and the step of generating a weighted sum of the second and filtered fields comprises weighting the second field in proportion to $1-\alpha$ and weighting the filtered field in proportion to $\alpha$. This allows for a smoother transition between dynamic and static areas of the picture.

The present invention also comprises methods for transmitting and/or storing image data. Such methods comprise the steps of generating first and second fields of data ($X_A$, $X_B$) respectively representative of alternate lines of an image at first and second instants of time; filtering the first and second fields to produce a filtered field ($X_B'$) with increased correlation to the first field; generating a motion parameter ($\alpha$) indicative of whether there is motion in the image; generating, as a function of the motion parameter, a weighted sum of the second and filtered fields ($X_B''$); combining the first field with the weighted sum of the second and filtered fields to form a frame; compressing the frame; and transmitting and/or storing the compressed frame.

The present invention also encompasses apparatus for carrying out the methods described above. One preferred embodiment of the invention comprises a first field store for storing a first field $X_A$ of a television signal and a second field store for storing a second field $X_B$ that sequentially follows the first field (e.g., by 1/60 seconds). This embodiment further includes an optional combiner that receives an output from each of the field stores and alternately combines (interlaces) the lines of the fields (the combining step is not always necessary). Correlation adjustment means, for adjusting the inter- and intra-frame spatial correlation between pixels, are disposed between the combiner and the field stores. The correlation adjustment means include a digital filter, a motion detector and means for combining filtered and unfiltered versions of the second field in accordance with the amount of motion detected.

It should be noted that the terms first field and second field as used in this specification refer to the respective fields that compose a frame of a video signal. In explaining the invention in a way that will make it easily understandable, the field first in time is referred to as the first field and the subsequent field is referred to as the second field. This pedagogical device, however, is not intended to imply that the invention is limited to filtering only the second field of each frame or filtering only one of either the first or second fields. In fact, in preferred embodiments all processing is applied symmetrically such that the first and second fields of each frame are processed in the same manner.

Other features of the invention are described below in connection with a detailed description of preferred embodiments.

BRIEF DESCRIPTION OF THE DRAWINGS

FIGS. 1A, 1B(1) and 1B(2) depict prior art compression algorithms.

DETAILED DESCRIPTION OF PREFERRED EMBODIMENTS

The present invention allows digital compression algorithms to operate on a single television image generated from two video fields without suffering the loss of correlation typically associated with interlaced scanning. The compressed information may also be used to reconstruct the two video fields without noticeable picture impairment.

Combining two fields by taking alternate lines from each field produces perfect results in static areas of the picture. In this case there is no loss of correlation due to interlace, as shown in FIG. 4A. However, in moving areas, objects would appear as shown in FIG. 4B, and a loss of correlation would occur. Methods in accordance with the present invention are based on the use of a motion detector to separate moving and non-moving areas of the scene. In static areas, a simple combination of lines from the first and second fields is used. In moving areas, a digital filter is applied to the image when combining the fields to reduce the motion artifacts and to increase correlation in the combined image. In general, the filter can be spatio-temporal in nature, with coefficient contributions form x, y and t (time). A system (motion filter) in accordance with the present invention is depicted in FIG. 5.

Figure 5:
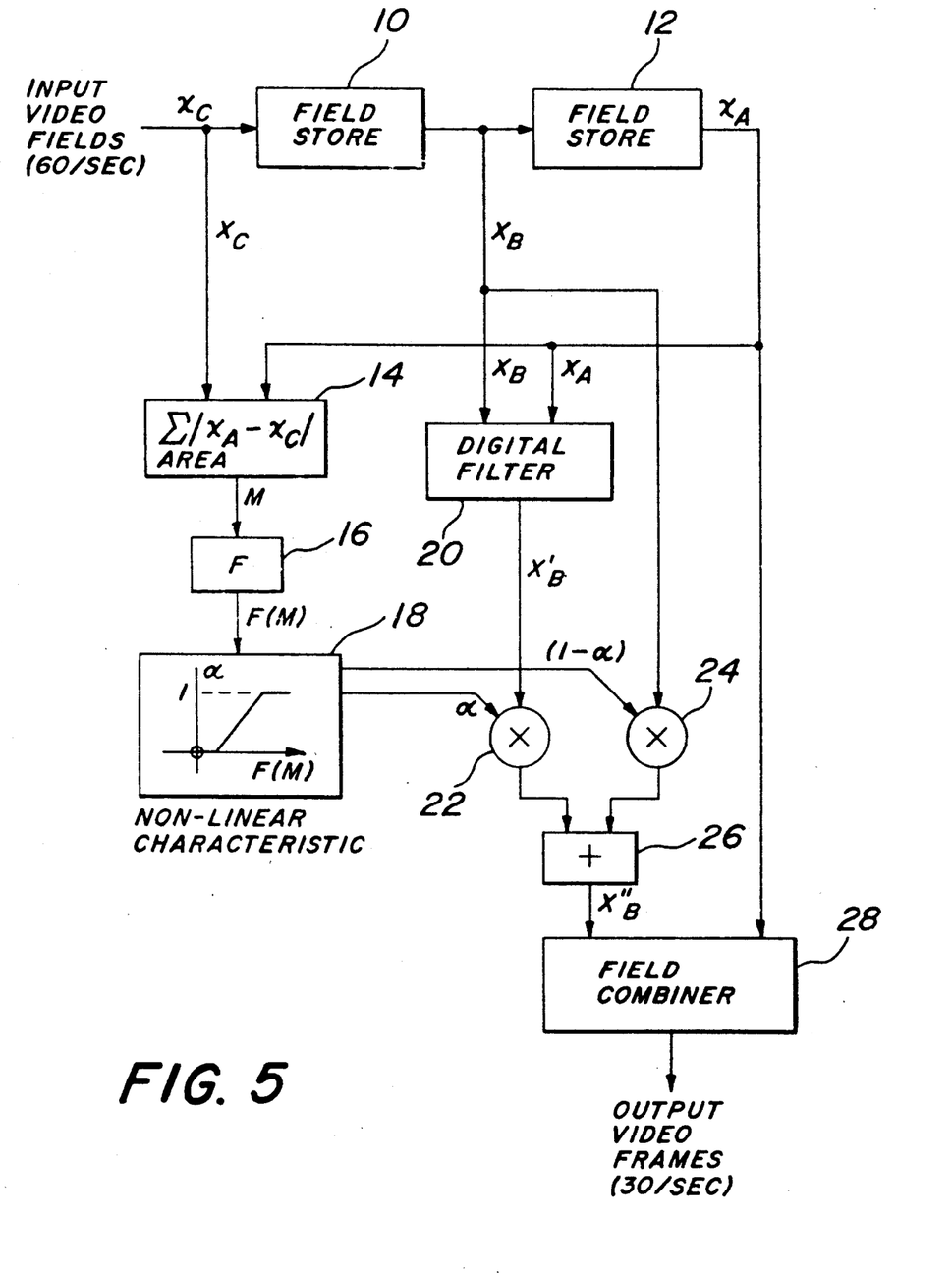
FIG. 5 is a block diagram of a motion filter in accordance with the present invention.

As shown in FIG. 5, input video fields are received at a rate of 60 fields per second, thus two fields will be received every 1/30 seconds. The first field to arrive, referred to in FIG. 5 as $X_A$, is stored in field store 12 and the second field to arrive, $X_B$, is stored in field store 10. The third field to arrive, which is the first field of the second frame, is referred to as $X_C$. The system further includes a motion detector comprising blocks 14, 16 and 18, the functions of which are described below (however since motion detectors are known in the art, a detailed description of one is not provided in this specification). In addition, there is a digital filter 20, multipliers 22, 24, a summing block 26 and an optional field combiner block 28. The output of the field combiner block is a series of video frames at a rate of 30 frames per second. It should be noted that the block diagram of FIG. 5 is a simplified illustration of a preferred embodiment: the most preferred embodiment is symmetrical with respect to the processing of fields $X_A$ and $X_B$; i.e., field $X_A$ is passed through digital filter 20 (or a second identical digital filter) and proportional multipliers 22, 24 (or other multipliers identical to multipliers 22, 24) and combined in a manner similar to that shown for $X_B$.

In one embodiment of the invention, the filtering provided by digital filter 20 consists only of vertical interpolation of pixels of the adjacent field (i.e., field $X_B$ is discarded and the scan lines that would have been provided by $X_B$ are derived by interpolating between corresponding pixels of adjacent lines of field $X_A$ in moving areas). In this case the motion artifact of FIG. 4B will be absent from the combined image. In another embodiment the filter applied in moving areas includes x, y and t terms, and produces an optimum balance of resolution in moving areas and correlation in the combined image. For example, in one embodiment a 1:8:1 pattern of weights is applied to adjacent lines of $X_A$, $X_B$ and $X_A$.

Figure 6:
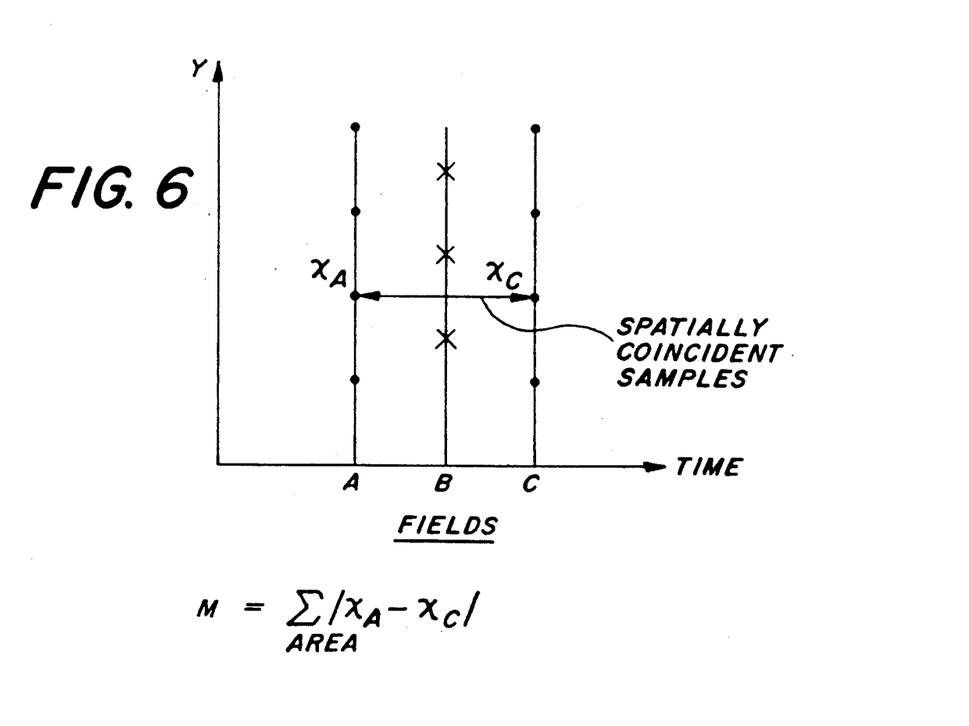
FIG. 6 illustrates the operation of a motion detector employed in a preferred embodiment of the present invention.

FIG. 6 shows a vertical/temporal (y, t) plane through an interlaced television picture. Motion is detected in the system of FIG. 5 by subtracting luminance values of coincident samples in fields A and C (i.e., the first fields of two successive frames) and summing the moduli over a small region of the picture (e.g., an 8×8 block of pixels) to produce a motion parameter $M = \Sigma |X_A - X_C|$, as indicated in block 14 of FIG. 5. Processing may then be applied to this signal, including non-linear processing to reduce noise and to limit the dynamic range. The parameter M is also filtered in the temporal direction in block 16. In FIG. 5, this processing is carried out by filter block 18. The parameter M is passed through a non-linear characteristic block 18 that limits its value to a range of 0–1. This processing is designed to optimally condition the parameter to detect motion in the region without responding to normal noise levels. Other forms of motion detectors are known and may also be used.

The output of the motion detector is a signal $\alpha$ which is zero (0) in static areas of the picture and smoothly transitions to one (1) in moving areas. This signal is employed to cross-fade between filtered and non-filtered versions of one or both of the fields before they are optionally combined into a single frame. The output of the motion filter is a single television image of 525 lines generated from two fields, each of 262½ lines. The new image will have full resolution in static areas and reduced resolution in moving areas, which has been found to be acceptable to viewers in HDTV applications.

We claim:

1. A method for increasing the correlation between pixels of an image, comprising the steps of:
    (a) filtering first ($X_A$) and second ($X_B$) fields of pixels to produce a filtered field ($X_B'$) with increased correlation to said first field;
    (b) generating a motion parameter ($\alpha$) indicative of whether there is motion in said image;
    (c) generating, as a function of said motion parameter, a weighted sum of said second and filtered fields; and
    (d) optionally combining said first field with said weighted sum of second and filtered fields to form a frame.

2. The method recited in claim 1, wherein said filtering step comprises vertically interpolating adjacent lines of said first field.

3. The method recited in claim 1, wherein said filtering step comprises vertically and horizontally combining pixels of said first and second fields.

4. The method recited in claim 1, wherein said step of generating a motion parameter $\alpha$ comprises summing over a prescribed area the absolute difference in value between corresponding pixels in said first field and a third field ($X_C$) representing the image at a later instant in time.

5. The method recited in claim 1, wherein said motion parameter $\alpha$ is restricted to values between 0 and 1 and said step of generating a weighted sum of said second and filtered fields comprises weighting said second field in proportion to $1 - \alpha$ and weighting said filtered field in proportion to $\alpha$.

6. The method recited in claim 1, wherein said filtering step comprises computing a weighted sum of adjacent lines of said first field and lines of said second field.

7. The method recited in claim 6, wherein said filtering step comprises applying approximately an 8 to 1 ratio of weights to said line of said second field and said adjacent lines of said first field.

8. The method recited in claim 2, 3 or 6, wherein:
    said step of generating a motion parameter $\alpha$ comprises summing over a prescribed area the difference in value between corresponding pixels in said first field and a third field ($X_C$) representing the image at a later instant in time; and
    said motion parameter $\alpha$ is restricted to values between 0 and 1 and said step of generating a weighted sum of said second and filtered fields comprises weighting said second field in proportion to $1 - \alpha$ and weighting said filtered field in proportion to $\alpha$.

9. A method for transmitting and/or storing image data, comprising the steps of:
    (a) generating first and second fields of data ($X_A$, $X_B$) respectively representative of alternate lines of an image at first and second instants of time;
    (b) filtering said first ($X_A$) and second ($X_B$) fields to produce a filtered field ($X_B'$) with increased correlation to said first field;
    (c) generating a motion parameter ($\alpha$) indicative of whether there is motion in said image;
    (d) generating, as a function of said motion parameter, a weighted sum of said second and filtered fields;
    (e) combining said first field with said weighted sum of said second and filtered fields to form a frame;
    (f) compressing said frame; and (g) transmitting and/or storing said compressed frame.

10. The method recited in claim 9, wherein said filtering step comprises vertically interpolating adjacent lines of said first field.

11. The method recited in claim 9, wherein said filtering step comprises vertically and horizontally combining pixels of said first and second fields.

12. The method recited in claim 9, wherein said step of generating a motion parameter $\alpha$ comprises summing over a prescribed area the difference in value between corresponding pixels in said first field and a third field ($X_C$) representing the image at a later instant in time.

13. The method recited in claim 9, wherein said motion parameter $\alpha$ is restricted to values between 0 and 1 and said step of generating a weighted sum of said second and filtered fields comprises weighting said second field in proportion to $1-\alpha$ and weighting said filtered field in proportion to $\alpha$.

14. The method recited in claim 9, wherein said filtering step comprises computing a weighted sum of adjacent lines of said first field and a line of said second field.

15. The method recited in claim 14, wherein said filtering step comprises applying approximately an 8 to 1 ratio of weights to said line of said second field and said adjacent lines of said first field.

16. The method recited in claim 10, 11 or 14, wherein:
said step of generating a motion parameter $\alpha$ comprises summing over a prescribed area the difference in value between corresponding pixels in said first field and a third field ($X_C$) representing the image at a later instant in time; and
said motion parameter $\alpha$ is restricted to values between 0 and 1 and said step of generating a weighted sum of said second and filtered fields comprises weighting said second field in proportion to $1-\alpha$ and weighting said filtered field in proportion to $\alpha$.

17. A motion filter for increasing the correlation between pixels of an image, comprising:
(a) means for filtering first ($X_A$) and second ($X_B$) fields of pixels to produce a filtered field ($X_B'$) with increased correlation to said first field;
(b) means for generating a motion parameter ($\alpha$) indicative of whether there is motion in said image;
(c) means for generating, as a function of said motion parameter, a weighted sum of said second and filtered fields; and
(d) means for combining said first field with said weighted sum of said second and filtered fields to form a frame.

18. The motion filter in claim 17, wherein said means for filtering comprises means for vertically interpolating adjacent lines of said first field.

19. The motion filter in claim 17, wherein said means for filtering comprises means for vertically and horizontally combining pixels of said first and second fields.

20. The motion filter in claim 17, wherein said means for generating a motion parameter $\alpha$ comprises means for summing over a prescribed area the absolute difference in value between corresponding pixels in said first field and a third field ($X_C$) representing the image at a later instant in time.

21. The motion filter in claim 17, wherein said means for generating a motion parameter $\alpha$ comprises means for restricting $\alpha$ to values between 0 and 1 and said means for generating a weighted sum of said second and filtered fields comprises means for weighting said second field in proportion to $1-\alpha$ and weighting said filtered field in proportion to $\alpha$.

22. The motion filter in claim 17, wherein said means for filtering comprises means for computing a weighted sum of adjacent lines of said first field and one or more lines of said second field.

23. The motion filter in claim 22, wherein said means for filtering comprises means for applying approximately and 8 to 1 ratio of weights to said line of said second field and said adjacent lines of said first field.

24. The motion filter in claim 18, 19 or 22, wherein:
said means for generating a motion parameter $\alpha$ comprises means for summing over a prescribed area the absolute difference in value between corresponding pixels in said first field and a third field ($X_C$) representing the image a later instant in time; and
said means for generating a motion parameter $\alpha$ comprises means for restricting $\alpha$ to values between 0 and 1 and said means for generating a weighted sum of said second and filtered fields comprises means for weighting said second field in proportion to $1-\alpha$ and weighting said filtered field in proportion to $\alpha$.

* * * * *